Jan. 16, 1962 F. W. LINDBLOM 3,016,543
GOGGLE WITH LIFTING COVER
Filed Dec. 28, 1959

INVENTOR.
FRANK W. LINDBLOM
BY
Barlow & Barlow
ATTORNEY

United States Patent Office 3,016,543
Patented Jan. 16, 1962

3,016,543
GOGGLE WITH LIFTING COVER
Frank W. Lindblom, Warwick, R.I., assignor to Welsh Manufacturing Company, a corporation of Rhode Island
Filed Dec. 28, 1959, Ser. No. 862,297
1 Claim. (Cl. 2—14)

This invention relates to a goggle of the type used by welders for protecting the eyes while engaged in welding. In a welder's goggle in addition to there being provided some sort of a window shield for protecting the eyes from flying particles, a light controlling means is provided so that the bright light from the welding operation will not be harmful to the eyes. When the welding operation is stopped, the light-reducing part of the goggle is no longer desired.

One of the objects of this invention is to provide an arrangement so that when the welding operation is stopped without removing the goggle from the head the light-retarding portion of the goggle may be removed from the line of vision so that normal vision through an undarkened lens may be had.

Another object of the invention is to provide an easy manner of temporarily removing the light obstructing portion of the goggle.

A further object of the invention is to provide for the removing of the light obstructing portion of the goggle by swinging a cover containing the light obstructing portion from the line of vision to a point above the line of vision and causing the same to remain there until moved back into covering position.

Another object of the invention is to provide a positive means for holding the cover in the selected position to which it has been moved whether it be in covering position or in uncovering position.

Another object of the invention is to provide a means for holding the covering frame in a selected position by a construction which will be itself well protected and one which is compact and effective.

With these and other objects in view, the invention consists of certain novel features of construction as will be more fully described and particularly pointed out in the appended claim.

Figure 1:
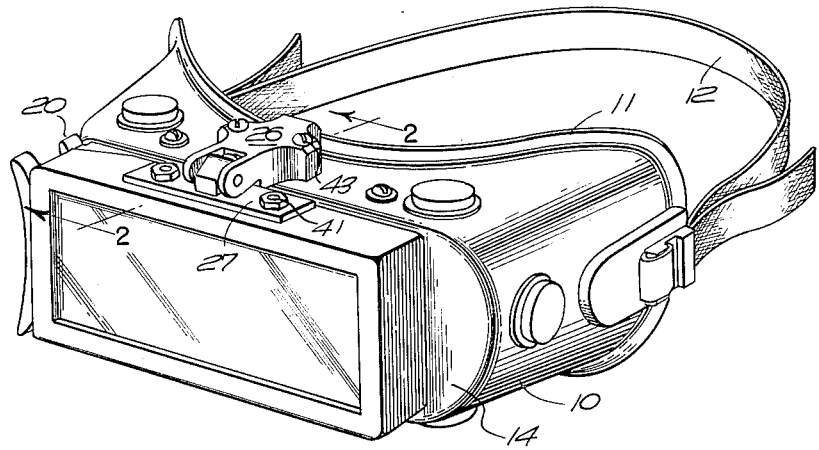
Figure 2:
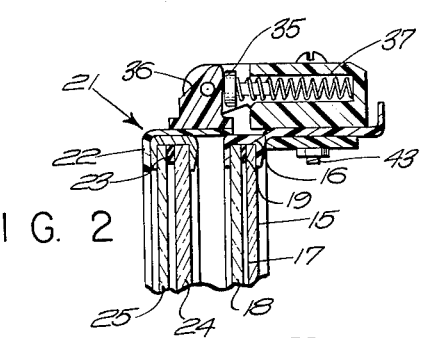
Figure 3:
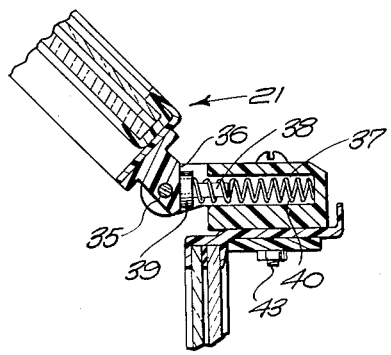
Figure 4:
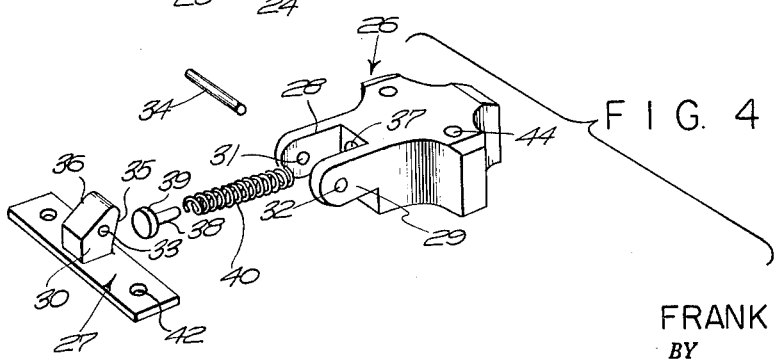

In the accompanying drawings:
FIGURE 1 is a perspective view of the goggle equipped with this invention;
FIGURE 2 is a section on line 2—2 of FIGURE 1 of a fragmental portion of the goggle;
FIGURE 3 is a view similar to FIGURE 2 but illustrating the covering frame as moved from covering position to raised position;
FIGURE 4 is a perspective exploded view of the various parts of the hinge.

In proceeding with this invention, the body of the goggle which has a sight lens is provided with a frame carrying a lens which controls the bright electric arc light so as to reduce its intensity on the eyes, and I have hinged this frame on the upper portion of the body of the goggle above the sight lens, the hinge being provided with means so that the frame may be positively held in covering position over the lens or may be swung to a position uncovering the lens and there positively held.

With reference to the drawings, 10 designates the body part of the goggle which is so shaped that it will receive the nose and cover the eyes, there being a flange 11 of flexible character so that the body may snugly engage the face about the eyes and be held thereto. An elastic strap 12 holds this body part in position on the face. The front portion 14 of the body is provided with a window opening 15 and about this opening there is a channel or groove 16 in which there is located one or more lenses 17 and 18. These lenses may be inserted by means of a carrier 19 having an end portion 20 as described in my co-pending application, Serial No. 668,524, filed June 27, 1957, now Patent No. 2,923,944, granted February 9, 1960. In the present instance either the lenses 17 or 18 or both of them will be clear lenses.

A cover designated generally 21 is provided to cover the lenses 17 and 18 and comprises a frame 22 in which there may be provided a carrier 23 similar to the carrier 19 and which contains lenses 24 and 25. The lens 24 will be provided with some light retarding material so as to dim the light materially in the line of vision of the wearer of the goggle. The other lens 25 will serve as a protection therefor.

It may be desirable to remove this light dimming lens from the line of sight, and in order to do so, I have arranged for swinging the frame 21 from the position shown in FIGURES 1 and 2 to the position shown in FIGURE 3 which will be out of the line of sight of the wearer of the goggle. The body portion 10 is provided with a member 26 and the frame 21 is provided with a member 27 as may be seen in FIGURE 4. These members are hinged together, the member 26 having a pair of ears 28 and 29 while the member 27 is provided with a post 30 to fit between the ears 28 and 29. Holes 31 and 32 are located in the ears 28 and 29 and align with a hole 33 in the post 30. These holes receive a pintle pin 34 to hingedly relate the parts 26 and 27.

The post 30 has an abutment surface 35 and another abutment surface 36 which abutment surfaces are arranged in planes at an acute angle to each other. In the member 26 there is a bore 37 (see FIGURES 2 and 3) in which there is located a pin 38 having a head 39. The head is a little larger than the bore so that it will not slide into the bore while the pin 38 is of a size to slide into the bore and is pressed outwardly by a spring 40 which encircles the pin and bears against the head 39 thereof to force the head against either the surface 35 as shown in FIGURE 2 or against the surface 36 as shown in FIGURE 3. When the pin is so forced against this surface, the frame 21 to which it is affixed will be held either in the position shown in FIGURE 2 which is a covering relation to the window or lens 17, 18 of the goggle or when swung to the position shown in FIGURE 3 it will be held in this position upwardly and out of the line of vision through the lenses 17 and 18.

The member 27 is secured to the frame 21 by some securing means such as bolts 41 passing through openings 42, while the member 26 is secured by means of bolts 43 passing through openings 44 in the member 26 to secure the member 26 to the body.

I claim:
A goggle comprising a body portion with a window opening and a lens closing said opening, a cover for said lens comprising a frame mounting a transparent shield, hinge means above said window opening for hinging said frame to said body portion for swinging said frame from lens covering position to a position out of the line of sight through said lens, said hinge means comprising a member secured to said frame and a member secured to said body portion, one of said members having a post with a pair of angularly related abutment surfaces less than 90° apart, the other member having a pair of ears between which said post extends and is pivoted, a plunger in a bore between said ears and a spring pressing it into engagement with said post to hold the post by engagement with a selected one of said abutment surfaces in either of two positions greater than 90° apart.

References Cited in the file of this patent

UNITED STATES PATENTS

| | | |
|---|---|---|
| 324,444 | Wolf | Aug. 18, 1885 |
| 2,270,238 | Clarke et al. | Jan. 20, 1942 |
| 2,588,792 | Barkley | Mar. 11, 1952 |

FOREIGN PATENTS

| | | |
|---|---|---|
| 702,186 | France | Jan. 19, 1931 |
| 201,777 | Austria | Jan. 26, 1959 |